(12) United States Patent
Irrgang et al.

(10) Patent No.: US 6,629,382 B2
(45) Date of Patent: Oct. 7, 2003

(54) FISHING ROD HANDLE

(75) Inventors: Peter Irrgang, Rigaud (CA); Yasuo Yoshida, Senneville (CA)

(73) Assignee: Wye-Yoshi Corporation, Senneville (CA)

( * ) Notice: Subject to any disclaimer, the term of this patent is extended or adjusted under 35 U.S.C. 154(b) by 0 days.

(21) Appl. No.: 09/837,263

(22) Filed: Apr. 19, 2001

(65) Prior Publication Data

US 2002/0017050 A1 Feb. 14, 2002

(51) Int. Cl.$^7$ ............................................... A01K 87/00
(52) U.S. Cl. ............................. 43/18.1; 43/22; 43/23; D22/142
(58) Field of Search ..................... 43/18.1, 18.1 R, 43/21.2, 22, 23, 25, 20; D22/137, 139, 142; 16/110.1

(56) References Cited

U.S. PATENT DOCUMENTS

| | | | | |
|---|---|---|---|---|
| 2,177,433 A | * | 10/1939 | Hedge ............................ | 43/23 |
| 2,180,323 A | * | 11/1939 | Maxwell ......................... | 43/23 |
| 2,191,004 A | * | 2/1940 | Whitcomb ....................... | 43/22 |
| D131,494 S | * | 3/1942 | Pontis .......................... | D22/142 |
| 2,711,047 A | * | 6/1955 | Shepherd ........................ | 43/23 |
| 4,014,129 A | * | 3/1977 | Capra ........................... | 43/23 |
| 4,697,377 A | * | 10/1987 | Martin .......................... | 43/23 |
| 4,905,400 A | * | 3/1990 | Brackett et al. ................. | 43/23 |
| D316,738 S | * | 5/1991 | Oyama .......................... | D22/142 |
| 5,033,224 A | * | 7/1991 | Woi-Hsi ......................... | 43/22 |
| 5,048,223 A | * | 9/1991 | Yamamoto et al. ................ | 43/22 |
| D342,985 S | * | 1/1994 | Grice ........................... | D22/142 |
| D347,878 S | * | 6/1994 | Grice ........................... | D22/142 |
| 5,337,507 A | * | 8/1994 | Oyama et al. .................... | 43/23 |
| 5,503,579 A | * | 4/1996 | Curran et al. ................... | 441/6 |
| 5,509,228 A | * | 4/1996 | Wright, Jr. ..................... | 43/23 |
| 5,632,111 A | * | 5/1997 | Takizawa ........................ | 43/20 |
| D381,736 S | * | 7/1997 | Grice ........................... | D22/142 |
| D389,554 S | * | 1/1998 | Ohmura .......................... | D22/142 |
| D400,961 S | * | 11/1998 | Pingel .......................... | D22/142 |
| D400,963 S | * | 11/1998 | Pingel .......................... | D22/142 |
| D400,964 S | * | 11/1998 | Pingel .......................... | D22/142 |
| D404,111 S | * | 1/1999 | Pingel .......................... | D22/142 |
| 5,860,190 A | * | 1/1999 | Cano ............................ | 16/422 |
| D429,454 S | * | 8/2000 | Lademann, III .................. | D8/303 |
| 6,105,301 A | * | 8/2000 | Ohmura .......................... | 43/22 |

FOREIGN PATENT DOCUMENTS

| | | | | |
|---|---|---|---|---|
| EP | 0 575 914 A1 | * | 12/1993 | .......... A01K/87/08 |
| JP | 10075691 A | * | 3/1998 | .......... A01K/87/00 |

* cited by examiner

*Primary Examiner*—Peter M. Poon
*Assistant Examiner*—Joan M. Olszewski
(74) *Attorney, Agent, or Firm*—George A. Seaby

(57) ABSTRACT

A fly fishing assembly includes a rod with an elongated sleeve mounted thereon and a cowl on one end of the sleeve for partially surrounding the rod in the vicinity of the reel to inhibit sliding of the hand of a user from the handle. By providing a flange on the bottom trailing end of the cowl, contact between the little finger of the hand holding the rod and the reel is prevented. Thus, the little finger can be positioned in front of the flange so that the caster can safely use it to lead the proper timing of casing.

6 Claims, 5 Drawing Sheets

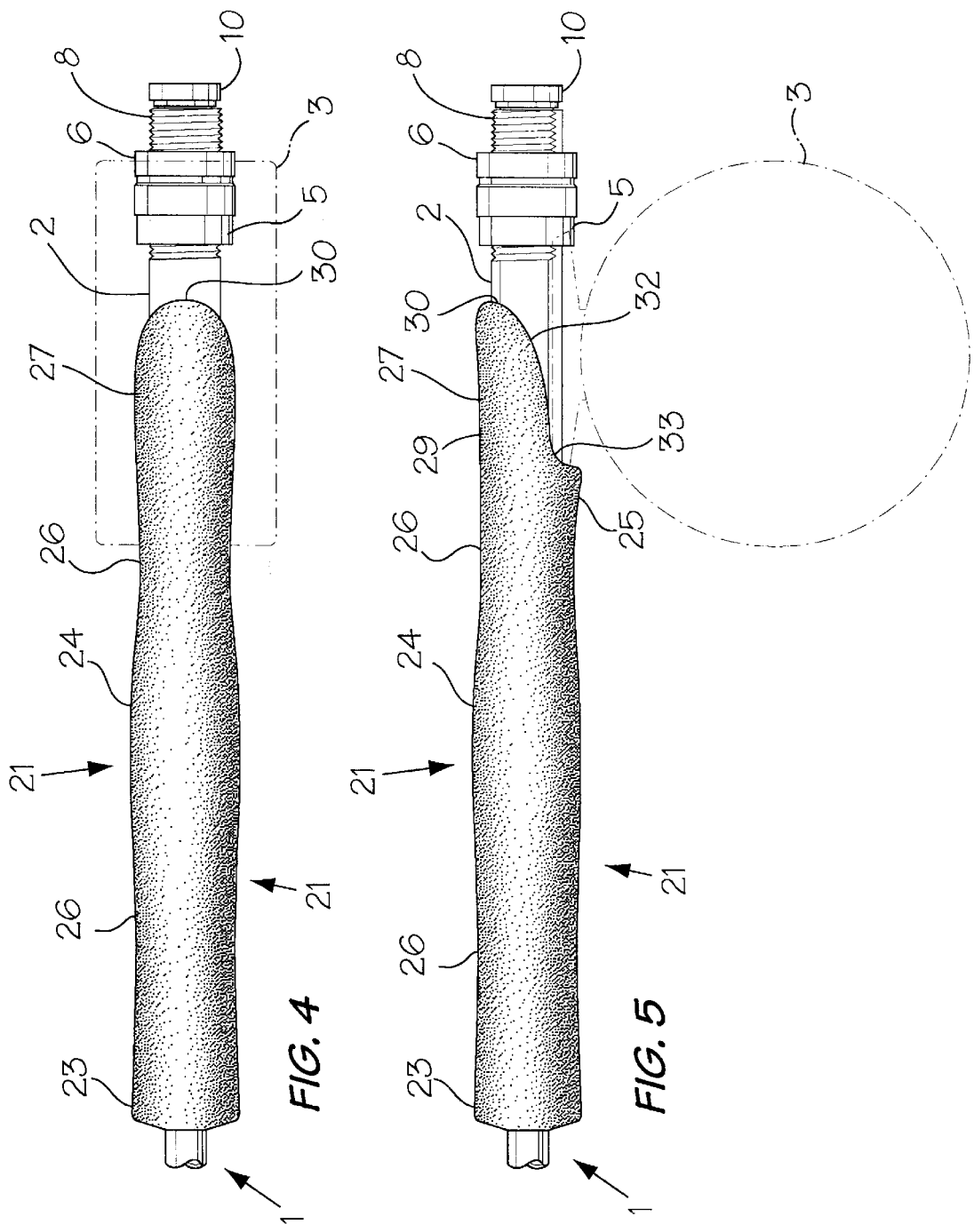

FISHING ROD HANDLE

BACKGROUND OF THE INVENTION

1. Field of the Invention

The present invention relates to a fly fishing assembly.

2. Discussion of the Prior Art

Successful fly fishing requires proper control of the rod by the user, especially during casting. The position of the user's hand on the rod to a large extent determines how well the rod will be controlled. One form of conventional fly fishing rod includes a threaded butt or rear end carrying a locking ring and an internally threaded locking nut, which are used to hold a reel on the rod. This type of reel lock is referred to as an up-locking reel lock. A handle for manipulating the rod, i.e. casting, is provided on the rod in front of the reel and the lock. Usually, the end of the rod in the vicinity of the reel and the locking ring is not covered by the handle.

During casting, the angler's hand tends to shift downwardly (i.e. rearwardly) along the handle encountering the cork edge of it and the locking ring which is uncomfortable. Because of the weight of the reel, the center of gravity of the rod is located at the rear or rod end of the rod. The user's hand naturally moves towards the center of gravity which exacerbates the slipping problem. In addition, shifting of the angler's hand on the rod effects balancing of the rod. Conventional fishing rod handles accommodate a limited range of hand positions, and do not always provide for hand locations in terms of comfort and balance to an angler's casting habits. Comfort and balance are important to precision and long distance casting.

Moreover, an expert angler usually positions the finger of the hand holding the fishing rod near the reel to guide the casts. Conventional handles do not prevent the little finger from contacting the reel during casting which can result in injury.

U.S. Pat. No. 5,048,223, which issued to Yamamoto et al on Sept. 17, 1991 discloses a fishing rod including a shaft, a reel mounting member and a handle grip on the butt end of the reel mounting member. The rod includes a second handle grip spaced from the butt end handle grip on the rod tip side of the reel mounting member. A portion of the butt end handle grip extends towards the second handle grip to partially cover the shaft adjacent the reel mounting member. The Yamamoto handle arrangement is not suitable for use with a fly fishing rod of the type including an up-locking mechanism for the reel.

U.S. Pat. No. 5,632,111, which issued to Takizawa on May 27, 1997, describes a fishing rod including a shaft, a butt end handle grip, a reel mounting member and a second handle grip spaced from the butt end handle grip on the tip end side of the reel mounting member. The handle includes a hood portion extending over an exposed section of the shaft adjacent the reel mounting member and between the handle grips. This portion of the handle bulges outwardly and defines an opening which allows the angler's hand to touch the shaft of the rod. The Takizawa handle arrangement is not suitable for use on a fly fishing rod, because it is not desirable to have the angler's hand touch the shaft. Moreover, the Takizawa handle arrangement is unsuitable for use with a rod having a reel mounted by means of an up-locking mechanism.

GENERAL DESCRIPTION OF THE INVENTION

An object of the present invention is to solve the problem of hand and finger shifting and the resulting loss of rod control by providing a fly fishing assembly having a handle, which permits an angler's hand to shift to a position proximate a reel mounted on the rod without slipping from the end of the handle or contacting the rod.

Another object of the invention is to provide a fly fishing assembly with a relatively streamlined handle on a fly fishing rod which is comfortable to use, even after repeated casts.

Accordingly, the invention relates to a fly fishing assembly comprising:

an elongated rod;

a reel seat body on one end of said rod for receiving a reel;

a reel on the bottom of the reel seat body;

an up locking reel lock for locking one end of said reel on said reel seat body; and a handle on said rod including:
an elongated sleeve on the rod overlapping said reel seat body for retaining a second end of the reel on the reel seat body, the sleeve having a smooth bulbous central portion, a flaring rear end, a first smooth, waisted portion between said central portion and said flaring rear end, and a semi-cylindrical cowl on the rear end of the sleeve partially surrounding the top and sides of the rod in the vicinity of the reel, the cowl having top and side surfaces forming a continuation of the flaring rear end of the sleeve for inhibiting rearward sliding of the hand of a user from the handle during casting.

BRIEF DESCRIPTION OF THE DRAWINGS

The invention is described hereinafter in greater detail with reference to the accompanying drawings, which illustrate a preferred embodiment of the invention and wherein:

FIG. 4 is a top view of the fly fishing assembly of FIG. 3;

FIG. 5 is a side view of the fly fishing assembly of FIG. 3; and

DESCRIPTION OF THE PREFERRED EMBODIMENT

Figure 1:
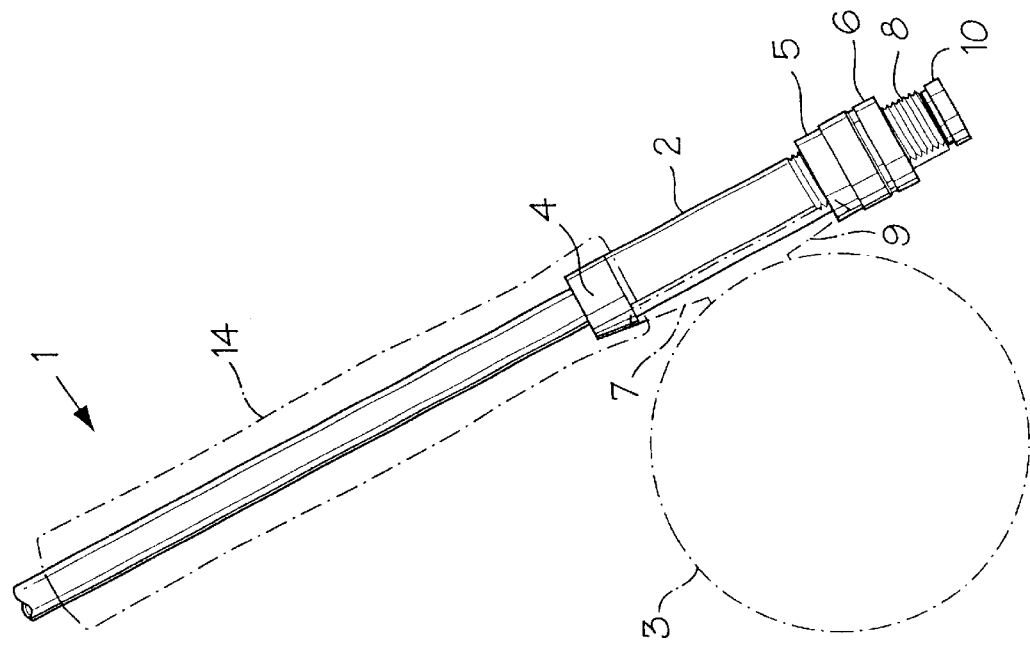
FIG. 1 is a side view of one end of a conventional fly fishing rod and handle.
Figure 2:
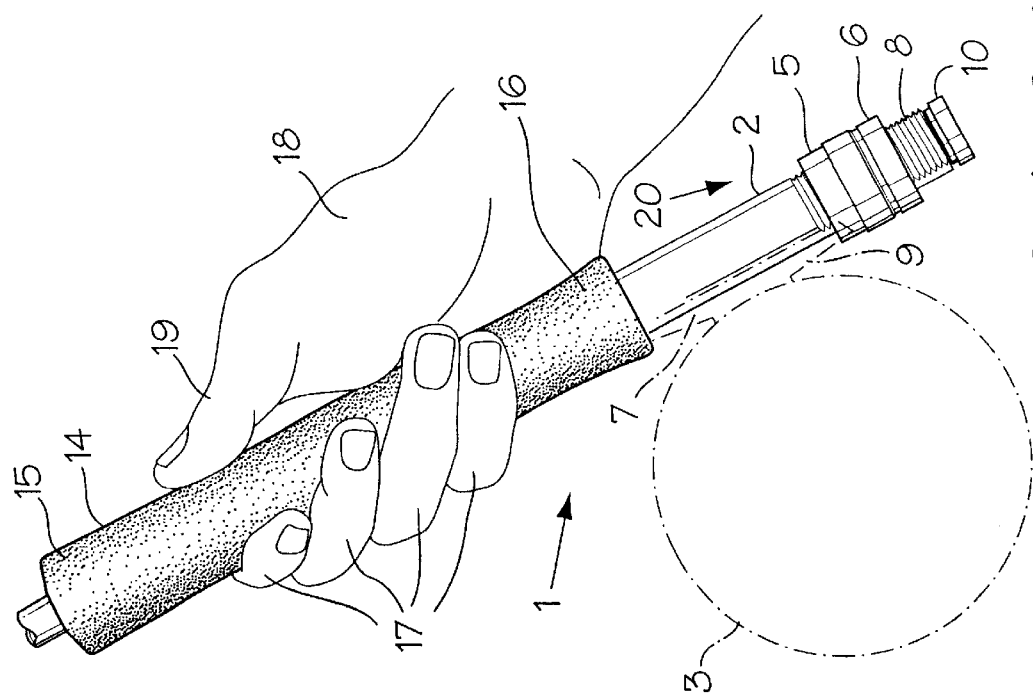
FIG. 2 is a side view of one end of the fly fishing rod of FIG. 1.

Referring to FIGS. 1 and 2, the butt or handle end of a conventional fly fishing rod indicated generally at 1 includes a reel seat body 2. A reel 3 (e.g. an A.F.T.H standard reel) is mounted on the reel seat body 2 using a fixed ring or hood 4, a slidable locking ring or hood 5, and an internally threaded locking nut 6. One foot 7 of the reel 3 is slid between the seat body 2 and the fixed ring 4, and the nut 6 is rotated on the threaded end 8 of the body 2 to move the ring 5 forwardly over the other foot 9 of the reel 3. A butt cap 10 retains the locking ring 5 and the nut 6 on the reel seat body 2.

As best shown in FIG. 1, a handle 14 (usually cork) is mounted on the rod 1 forwardly of the reel mounting position. The handle 14 is a generally cylindrical sleeve with slightly flared front and rear ends 15 and 16, respectively. During use of the rod, the handle 14 is gripped by an angler by wrapping the fingers 17 of the hand 18 around the handle 14, and resting the thumb 19 on the handle. When casting, the angler's hand 18, which is shown in the pre-casting position in FIG. 1, tends to slide along the handle 14 towards the butt end of the rod 2, i.e. in the direction of arrow 20 towards the locking ring 6. Thus, the angler's hand comes into contact with the exposed portion of the rod, rearwardly of the handle. Not only is this uncomfortable, but the result is a reduction in casting accuracy and efficiency.

Figure 3:
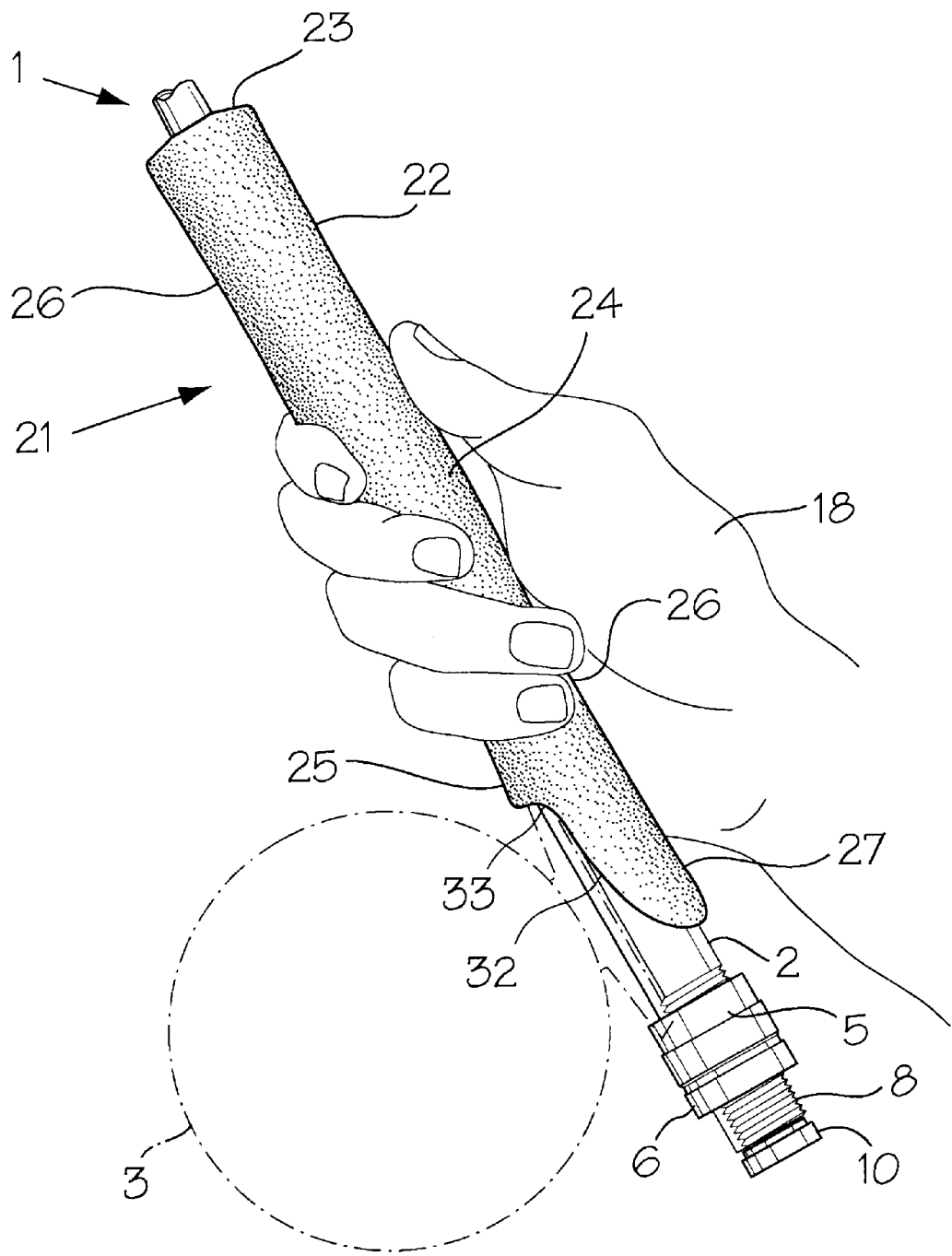
FIG. 3 is a side view of one end of a fly fishing assembly in accordance with the present invention.

With reference to FIGS. 3 to 5, an assembly in accordance with the present invention includes a rod 1 and, a handle indicated generally at 21 which is defined by a smooth, cylindrical sleeve 22 with a flaring front end 23, a slightly bulbous central portion 24 and a flaring rear end 25. Smooth, waisted portions 26 are provided between the central portion 24 and the flaring front and rear ends 23 and 25, respectively. A cowl 27 on the butt end of the handle 21 partially surrounds the reel seat body 2. The cowl is generally semi-cylindrical, and U-shaped when viewed from above (FIG. 4). The top surface of the cowl 27 forms a continuation of the flaring top surface 29 of the rear end 25 of the handle 21, and the sides define continuations of the sides of the handle. The cowl 27 includes a convex trailing end 30, convex bottom side edges 32 and a concave shoulder 33 at the rear end 25 of the handle 21. As shown in FIG. 3, when casting, the cowl 27 prevents contact of the hand 18 with the reel seat body 2 if the hand happens to slide back to a position near the reel 3.

Figure 6:
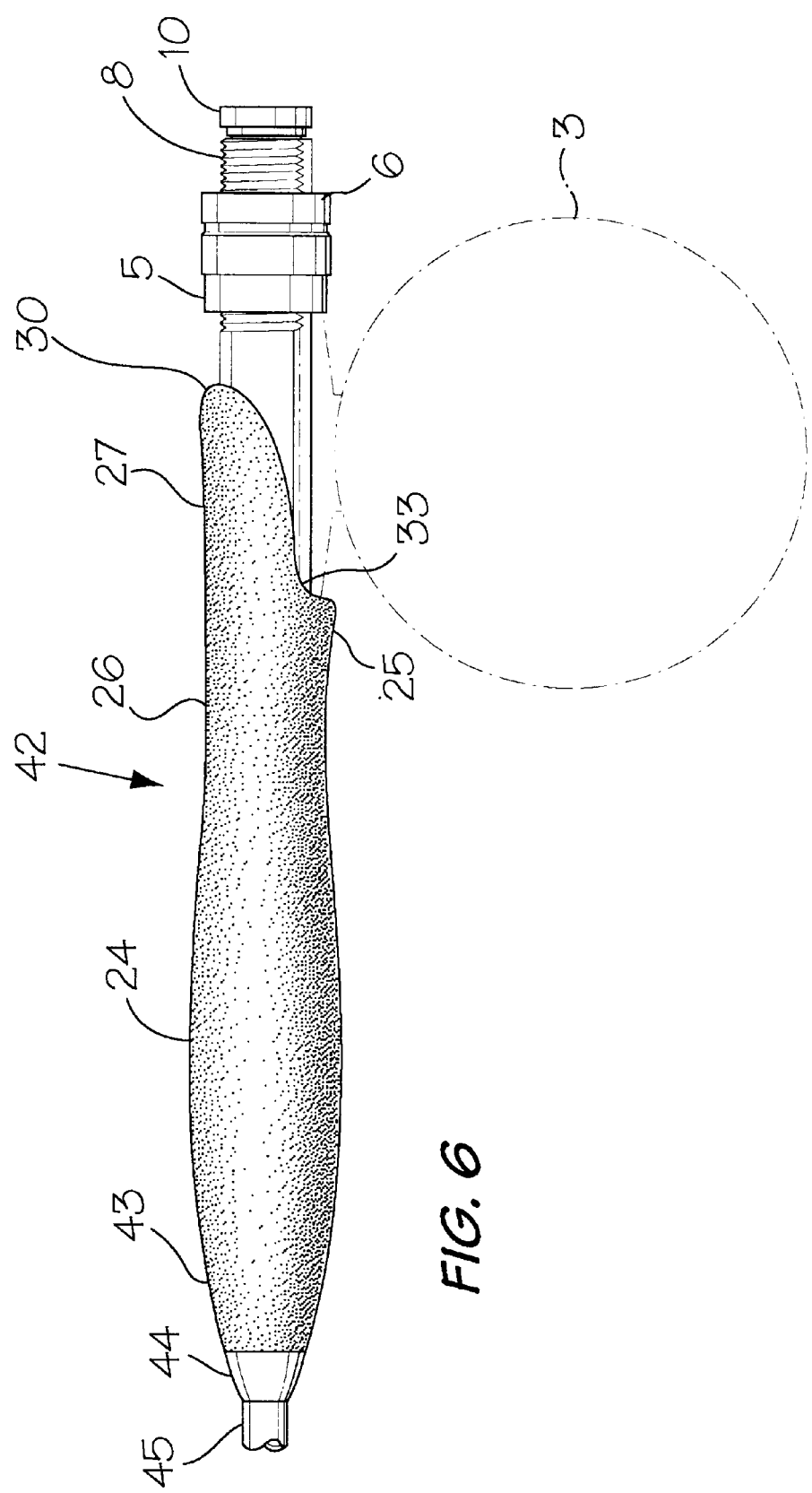
FIG. 6 is a side view of a second embodiment of the fly fishing assembly according to the invention.

In a second embodiment of the invention (FIG. 6), the center 24 and rear or butt end 25 of the handle indicated generally at 42 are the same as in the handle of FIGS. 3 to 5. The front end 43 of the handle 42 tapers forwardly, and a tapering metal ring 44 at such front end limits movement of the handle forwardly on the rod 45.

Figure 7:
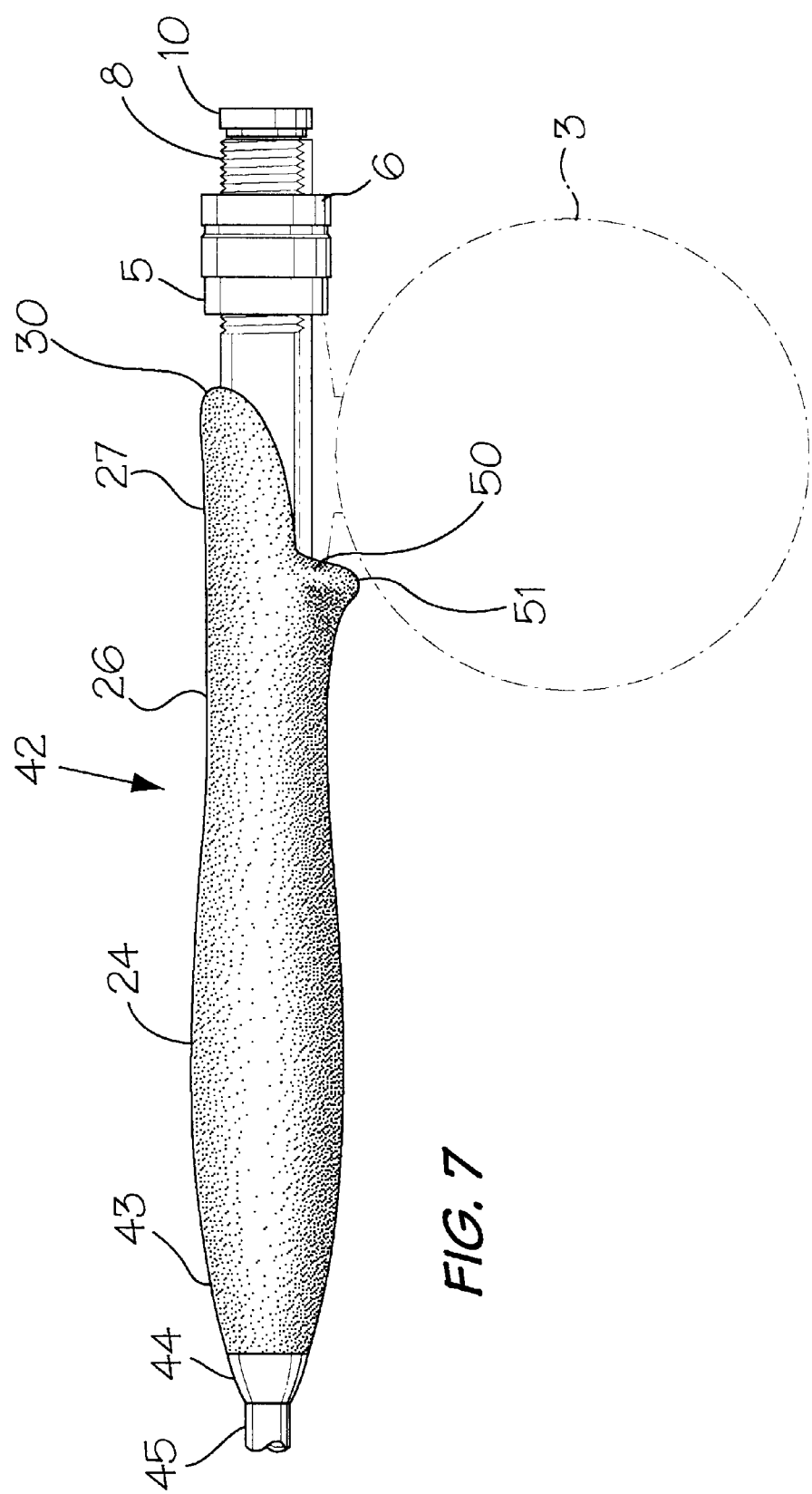
FIG. 7 is a side view of a third embodiment of the fly fishing assembly according to the invention.

In order to control the stroke of the cast, an expert angler positions the little finger of the hand holding the rod near the butt end 25 (FIG. 6) of the handle 42. In a third embodiment of the invention (FIG. 7), the center 24 and the front end 43 of the handle indicated generally at 42 are the same as in the handle of FIG. 6. In the third embodiment, the butt end 25 (FIG. 6) of the cowl 27 includes a semi-cylindrical, outwardly tapering flange 50 having a slightly bulbous, convex tip 51. The flange 50 prevents, or at least substantially reduces, the likelihood of hand contact with the reel 3 during casting. The flange 50 can either be integral with the cowl 27 or made as a separate "add on" component. The sides of the flange 50 taper into the body of the handle.

It will be appreciated that the handle and cowl can have other shapes. For example, the trailing end of the cowl can be rectangular when viewed from above or either side. The shoulders of the cowl can define more gradual curves from the flared end of the handle to the bottom side edges of the cowl. The trailing end and bottom side edges of the cowl can be finished with a metal wire bead (not shown) for aesthetic purposes. The main consideration is that the cowl covers at least a portion of the butt end of the rod in the vicinity of the reel, preventing, or at least substantially reducing, the likelihood of hand contact with the rod during casting, and permitting an angler's hand to assume different positions It will also be appreciated that the cowl can be made as a separate "add on" component. For this purpose, the cowl can be used to retrofit a conventional fishing rod handle by affixing the "add on" cowl to a reel seat body at the butt end of a fishing rod handle. An add on cowl includes a generally cylindrical body having the shapes described above, which can be permanently or removably attached to the handle.

We claim:

1. A fly fishing assembly comprising:

an elongated rod;

a reel seat body on one end of said rod for receiving a reel;

a reel on the bottom of the reel seat body;

an up locking reel lock for locking one end of said reel on said reel seat body;

a fixed ring for locking a second end of said reel on said reel seat body; and a handle on said rod including:

an elongated sleeve on the rod overlapping said reel seat body, the sleeve having a smooth bulbous central portion, a flaring rear end, a first smooth, waisted portion between said central portion and said flaring rear end, and a semicylindrical cowl on the rear end of the sleeve partially surrounding the top and sides of the fixed ring and the reel seat body in the vicinity of the reel, the cowl having top and side surfaces forming a continuation of the flaring rear end of the sleeve for inhibiting rearward sliding of the hand of a user from the handle during casting the top surface of the cowl covering the fixed ring and a major portion of the reel seat body.

2. The fly fishing assembly of claim 1, wherein said sleeve includes a flaring front end, and a second smooth, waisted portion between said central portion and said front end.

3. The fly fishing assembly of claim 1, wherein said cowl includes a convex trailing top end.

4. The fly fishing assembly of claim 3, wherein said cowl includes convex bottom side edges.

5. The fly fishing assembly of claim 1, wherein said cowl includes a flange on a bottom rear end thereof adjacent the reel for preventing sliding of the hand of a user against the reel.

6. The fly fishing assembly of claim 5, wherein said cowl includes a convex trailing end, convex bottom side edges and concave shoulders between said trailing end and said bottom side edges, and said flange extends around the bottom of the handle between said bottom side edges of the cowl.

\* \* \* \* \*